United States Patent
Saliba et al.

(10) Patent No.: US 10,423,904 B2
(45) Date of Patent: Sep. 24, 2019

(54) WORKFORCE OPTIMIZATION BY IMPROVED PROVISION OF JOB PERFORMANCE PLAN

(71) Applicant: ABB Technology AG, Zurich (CH)

(72) Inventors: Sleman Saliba, Heidelberg (DE); Iiro Harjunkoski, Weinheim (DE); Carsten Franke, Stetten (CH)

(73) Assignee: ABB Schweiz AG, Baden (CH)

( * ) Notice: Subject to any disclaimer, the term of this patent is extended or adjusted under 35 U.S.C. 154(b) by 969 days.

(21) Appl. No.: 14/732,370

(22) Filed: Jun. 5, 2015

(65) Prior Publication Data

US 2015/0356491 A1 Dec. 10, 2015

(30) Foreign Application Priority Data

Jun. 5, 2014 (EP) .................................... 14171360

(51) Int. Cl.
| | | |
|---|---|---|
| *G06Q 10/00* | (2012.01) | |
| *G06Q 10/06* | (2012.01) | |
| *G06Q 10/10* | (2012.01) | |
| *G06F 16/29* | (2019.01) | |
| *H04W 4/021* | (2018.01) | |

(52) U.S. Cl.
CPC ..... *G06Q 10/063112* (2013.01); *G06F 16/29* (2019.01); *G06Q 10/06398* (2013.01); *G06Q 10/063114* (2013.01); *G06Q 10/063116* (2013.01); *G06Q 10/103* (2013.01); *G06Q 10/105* (2013.01); *H04M 2203/402* (2013.01); *H04W 4/021* (2013.01)

(58) Field of Classification Search
None
See application file for complete search history.

(56) References Cited

U.S. PATENT DOCUMENTS 6,578,005 B1   6/2003 Lesaint et al.
6,738,815 B1 * 5/2004 Willis, Jr. ............... H04L 69/08
                                                                709/219
(Continued)

FOREIGN PATENT DOCUMENTS

WO      WO 98/22897 A1    5/1998

OTHER PUBLICATIONS

Extended European Search Report dated Nov. 20, 2014, by the European Patent Office in corresponding European Patent Application No. 14171345.3-1955.
(Continued)

*Primary Examiner* — Gurkanwaljit Singh
(74) *Attorney, Agent, or Firm* — Barnes & Thornburg LLP

(57) ABSTRACT

A computer-implemented method provides a job performance plan for a plurality of jobs to be performed at geographical locations. The computer receives job data that represent job requirements for specified locations and processes the job data with the data-structure to provide an initial job performance plan. The computer receives updated job data and identifies a sub-set of the data structure. The computer processes the updated job data with the sub-set to provide an updated job performance plan, wherein some of the routes are re-assigned to specified job performers. The sub-set is selected under consideration of location clusters. Step repetitions with different clusters are provided to increase accuracy.

15 Claims, 10 Drawing Sheets

(56) References Cited

U.S. PATENT DOCUMENTS

| | | | | |
|---|---|---|---|---|
| 2003/0167199 A1* | 9/2003 | Thomann | ......... | G06Q 10/06311 |
| | | | | 705/35 |
| 2012/0065944 A1* | 3/2012 | Nielsen | ................ | G06Q 10/103 |
| | | | | 703/1 |
| 2012/0089432 A1* | 4/2012 | Podgurny | ........ | G06Q 10/06311 |
| | | | | 705/7.13 |
| 2012/0089493 A1* | 4/2012 | Podgurny | .............. | G06Q 10/06 |
| | | | | 705/32 |
| 2013/0030873 A1* | 1/2013 | Davidson | ............... | G06Q 10/06 |
| | | | | 705/7.36 |
| 2014/0329210 A1* | 11/2014 | Masood | ............... | G06Q 10/103 |
| | | | | 434/219 |

OTHER PUBLICATIONS

Extended European Search Report dated Nov. 20, 2014, by the European Patent Office in corresponding European Patent Application No. 14171360.2-1955.

\* cited by examiner

WORKFORCE OPTIMIZATION BY IMPROVED PROVISION OF JOB PERFORMANCE PLAN

RELATED APPLICATION(S)

This application claims priority under 35 U.S.C. § 119 to European application 14171360.2 filed on Jun. 5, 2014, the content of which is hereby incorporated by reference in its entirety.

FIELD

The present disclosure generally relates to computers and more for example relates to computers that schedule jobs that are performed by service organizations.

BACKGROUND INFORMATION

In industrial environments, such as in utilities industries or communications industries, services such as equipment installation, equipment maintenance or repair works are often performed by service organizations that respond to service requests from customers. For example, customers frequently order certain services to be performed by the service organisation. The organization then dispatches service persons, such as technicians, to the location of the customers to actually perform the service.

Service requests are related to a variety of conditions. From a time aspect, service requests can have an appointment window during that the service has to be performed. The window usually can have an earliest start time and a latest end time. From a space aspect, the service can be performed at a geographical location that is identified, for example, by a street address, or by geographical coordinates. The technician can move physically to and from the location. Further aspects include—to name only a few—skill sets of the service persons, priorities in comparison to other requests, or potential gains or benefits for the organization.

The service organization can optimize the use of its workforce, and assigning services to persons or equipment can become a computer technique. The computer receives the details for all requests including locations and time slots, and the computer receives data regarding the service persons such as skill sets and allowable duty times. The computer calculates plans or schedules, and personalizes the results to specified persons as duty-rosters or the like. Such a duty-roster can be a document that lists a sequence of jobs to be performed by the person along a calculated route or tour of geographical locations.

However, real-life service organisations handle thousands of requests per day, so that the computer handles a huge amount of data. The computation can call for substantial resources (in terms of processors and memory) and—as a limiting constraint—the time it takes the computer to calculate the assignments is comparable to the time it takes the persons to perform the service and to travel along the routes. As a consequence, assignments are usually calculated overnight (or day-ahead) when the services are not yet due.

To further complicate the topic, the requests can change. The customer can cancel a request, move to a different location, desire a different appointment window etc. Service persons can become non-available, or transportation along the calculated routes can become interrupted. As a consequence, the computer receives data that is continuously changing. The changes usually become evident when the duty-rosters have been distributed, very often during daytimes. The changing data comes from a variety of sources, for example, from call centres, traffic information control systems, from applications that monitor equipment.

For the computers, this situation results in a number of conflicting constraints. For example, the changes should be accommodated by the computer within a short computation time, but the accuracy of the assignment has to be maintained.

SUMMARY

An exemplary computer-implemented method is disclosed for providing a job performance plan for a plurality of jobs to be performed at geographical locations and being assigned to job performers, the method comprising: in a processor of the computer: pre-processing a data-structure to identify routes between the geographical locations; receiving job data that represent job requirements for specified locations and that represent availability of job performers; processing the job data with the data-structure to provide an initial job performance plan, wherein some of the routes are assigned to specified job performers; receiving updated job data with a representation that is a geographical location with an updated job requirement; identifying a sub-set of the data-structure having a first portion and a second portion by: selecting, in the data-structure, the first portion to correspond to a first area with first geographical locations that comply with a first condition in relation to the updated location; selecting, in the data-structure, the representations of a set of performers for that locations of the first area are assigned to; and selecting, in the data-structure, the second portion to correspond to a second area with second geographical locations that are also assigned to the set of performers; and processing the updated job data with both portions of the sub-set of the data-structure to output an updated job performance plan, wherein some of the routes are re-assigned to specified job performers.

DETAILED DESCRIPTION

Figure 1:
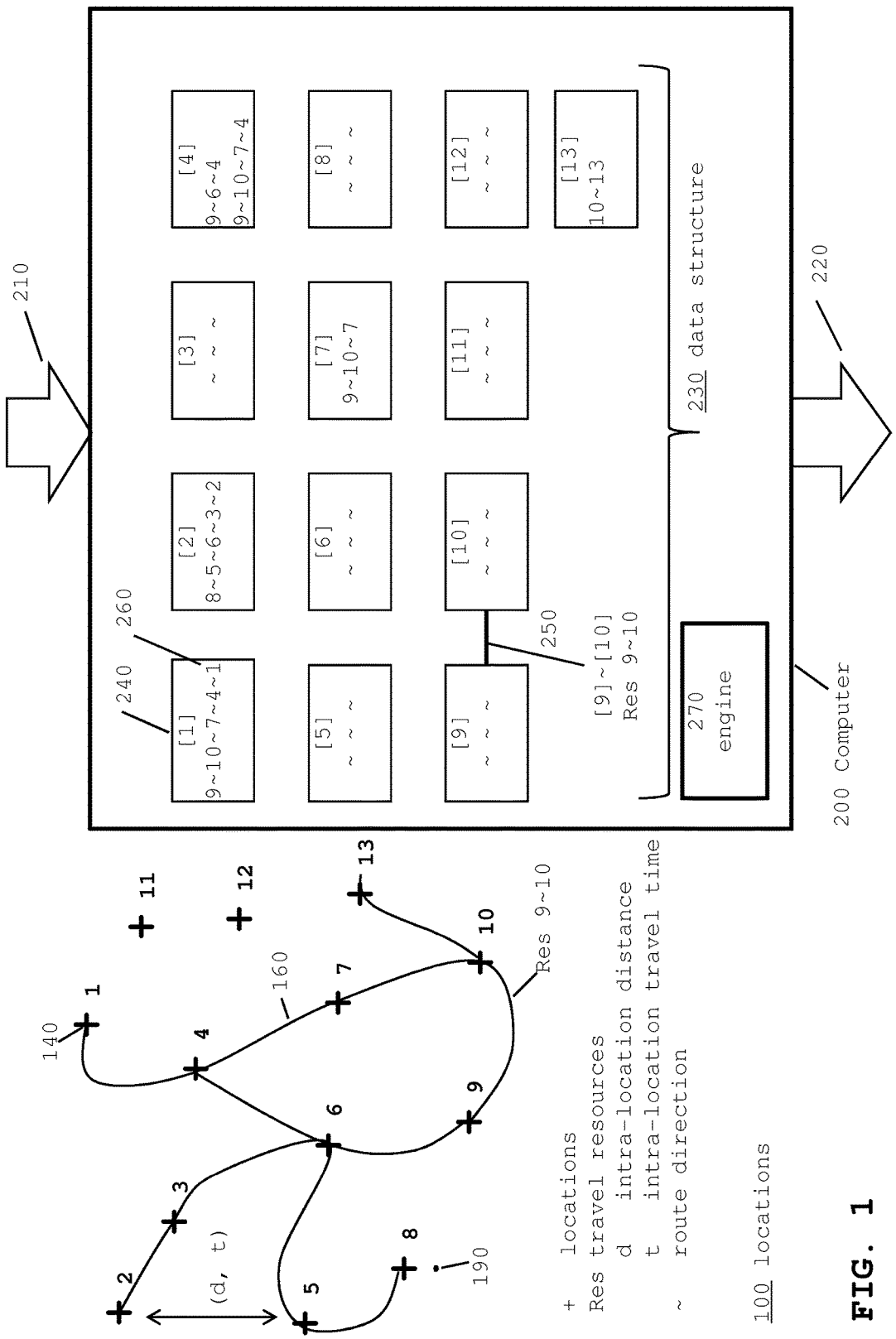
FIG. 1 illustrates an overview of a scenario with the real world and with a data-structure in a computer prior to receiving job requirements in accordance with an exemplary embodiment of the present disclosure.

According to exemplary embodiments of the present disclosure, a computer-implemented method, a computer, and computer program product is presented to provide a job performance plan in an improved data processing approach by clustering elements of a data-structure into sub-structures.

The plan is the data output of the computer, and the data relates to a plurality of jobs that are to be performed at geographical locations by job performers (such as humans and/or technical equipment). The computer assigns the job performers to the jobs.

An exemplary computer of the present disclosure operates according to technical optimization goals that are related to the amount of data to be processed and to the processing time. The computer provides an initial job performance plan optimized for a high number of performer-to-location assignments and for minimal use of resources for travel, including time and distance. Triggered by change requests, the computer provides an updated performance plan optimized with a minimal number of re-assignments in comparison to the initial plan.

Because the locations and the performers are entities outside the computer, the computer uses technical representations or elements, such as a data-structure to represent the geographical locations, route vectors in the data-structure to represent directed concatenations of locations (or routes), job data to represent requirements and availability, and a sub-set of the data-structure with portions to represent geographical areas.

In a pre-processing step, the computer processes the data-structure to identify routes between the geographical locations. In a receiving step, the computer receives job data with job requirements for specified locations and with availability information of the job performers. The computer processes the job data with the data-structure to provide an initial job performance plan. In the plan, some of the routes—and locations as well—are assigned to specified job performers.

In case of change requests, the computer receives job data again, but as an update. The updated job data can represent an updated location. An updated location is a geographical location with an updated job requirement. Because locations in combination with job assignments to locations around the updated location are candidates for re-assignments, the computer identifies a sub-set of the data-structure that is to be processed again. In other words, the computer determines a data cluster that represents jobs that are likely affected by the update and that will be affected by re-scheduling. The sub-set of the data-structure can have a first portion and can have a second portion. The computer selects both portions differently. The first portion of the sub-set represents a first area, and the second portions of the sub-set represent a second area with geographical locations.

To select the first portion, the computer scans the data-structure for geographical locations that comply with a first condition in relation to the updated location. The first condition is a condition that relates locations to locations, to identify locations belonging to areas. The complying geographical locations—first locations—are in the first area. The computer then scans the data-structure for performers for that location of the first area are assigned to. In other words, prior to receiving the change request, the computer can establish a schedule for dispatching performers to specified locations. But having identified the first area, the computer can identify a set of performers that have assigned locations in the first area: the first area performers are performers that are already in the first area, or that are scheduled to travel to the first area. To select the second portion, the computer scans the data-structure for geographical locations that are also assigned to the set of performers. These are second locations in the second area. In that sense, the first area is enlarged by the second area. The first area identified by a location-to-location condition and the second area is identified by using the existing performer-to-location assignments.

The computer then processes the updated job data with both portions of the sub-set of the data-structure and provides an updated job performance plan. In that updated plan, some of the routes are re-assigned to specified job performers.

In an exemplary embodiment of the present disclosure, pre-processing the data-structure to identify routes between the geographical locations can be executed with a graph data structure in that nodes represent the geographical locations, and in that edges represent travel parameters for the job performers travelling between the geographical locations. The edges can be directed edges, so-called arcs. This approach allows distinguishing directed traffic infrastructure—including one-way-streets or construction sites in a motorway—from non-directed infrastructure. The computer can select the first portion to include a first sub-set of nodes that correspond to the first area with geographical locations, and can select the second portion to include a second sub-set of nodes that correspond to the second area with geographical locations.

In another exemplary embodiment of the present disclosure, the computer can pre-process the data-structure to identify routes between the geographical locations. The computer can store routes vectors and corresponding accumulated travel parameters in data attributes at the nodes of the data-structure.

According to another exemplary embodiment, the computer can pre-process the data-structure to identify routes between the geographical locations by removing route vectors and corresponding accumulated travel parameters if the accumulated travel parameters exceed pre-defined threshold values. Such an approach avoids to store and to process data that does not support the above-mentioned optimization goals.

In yet another exemplary embodiment, the computer can process the updated job data with the sub-set of the data-structure to provide an updated job performance plan. This can include processing the updated job data together with (the representation of) the updated location. In case that the updated location is a location that is no longer to be included in the performance plan, for example, in case of cancellations, (the representation of) the removed location is usually not processed.

According to an exemplary embodiment described herein, the first condition for the first area of geographical locations can be complied with for geographical locations that surround the updated location with a predetermined maximal distance value. The maximal distance value can be the direct distance or geographical air distance calculated from geographical coordinates of the locations, a distance calculated under consideration of travel ways, the overall time or the energy consumption for travel, or emissions caused by the travel.

In another exemplary embodiment of the present disclosure, the first condition for the first area of geographical locations can be complied with for a plurality of geographical locations that are assigned to an assigned job performer and that have an average distance value that is shorter than the predetermined maximal distance value.

In an exemplary embodiment, a complete re-assignment is not specified, but in repetitions, assignments are added. More in detail, the computer can process the updated job data to an updated job performance plan in that a specified location remains without a job performer assigned to that location. In this case, the computer identifies the sub-set of the data-structure again and processes the updated job data again, but with a representation of the specified location being received as updated job data. In other words, gaps in the updated performance plan are allowed if the plan is recalculated.

According to an exemplary embodiment of the present disclosure, the computer repeats the calculation with modified conditions. When the computer identifies the sub-set again, the computer can use a second condition that is related to the first condition by a numerical factor. The factor can make the first area for an updated first portion smaller in comparison to the previously used first area. A computer that re-calculates a plan for a smaller geographical area uses less computation resources that represent the location in the area, such as nodes. As a consequence, the computation is more efficient. In the repetition, the geographical area for an updated first portion can however have substantially the same size as the previously used area.

In accordance with another exemplary embodiment a computer program or computer program product in which the computer program is stored on a non-transitory computer readable medium—when loaded into a memory of the computer and being executed by at least one processor of the computer—performs the steps of the computer-implemented method.

In an exemplary embodiment, the computer can have a processing engine that executes the processing steps. The engine can be implemented as a separate solver program that runs on the same computer or that runs on a different computer.

Figure 2:
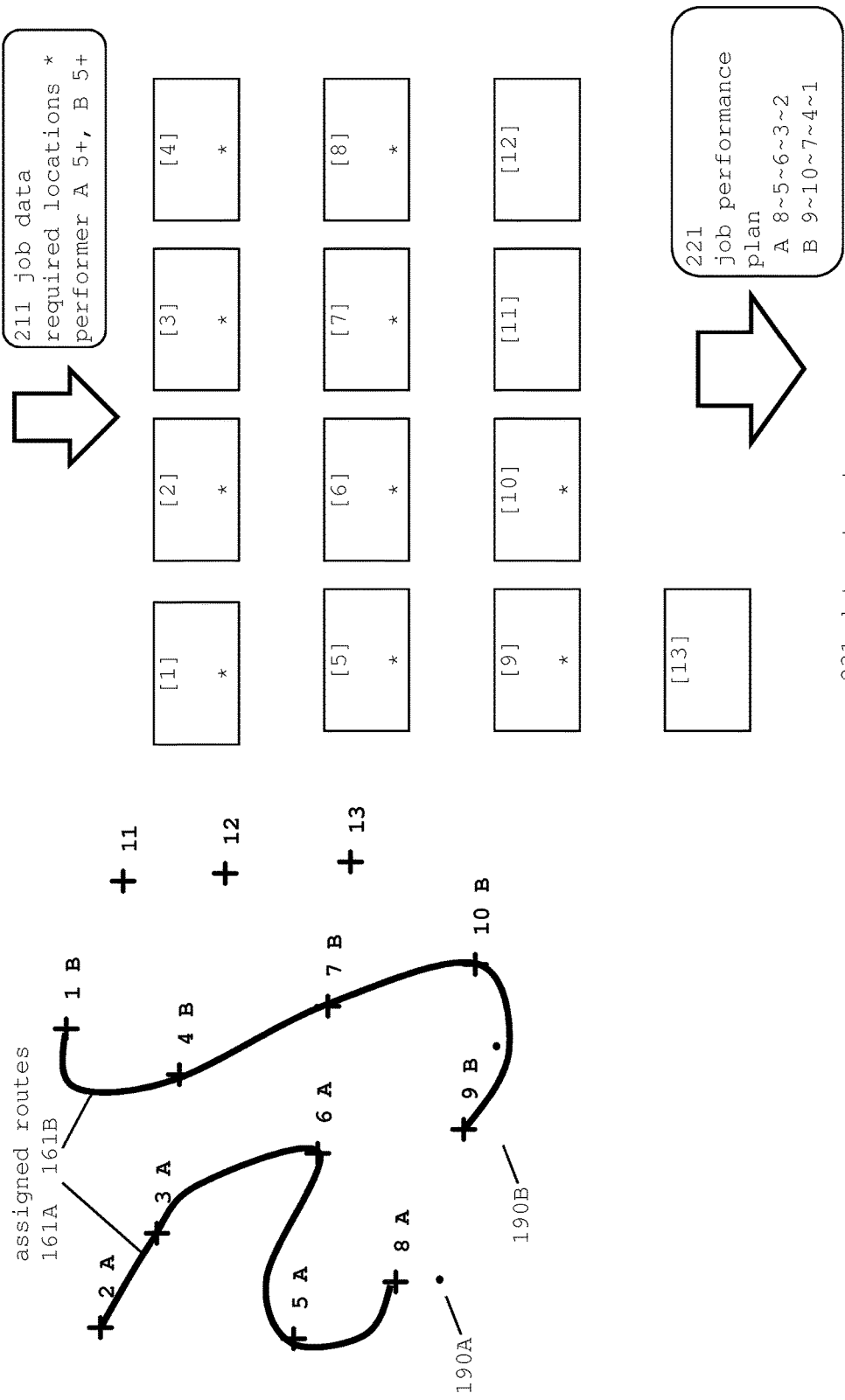
FIG. 2 illustrates the overview of the scenario in that the computer receives job data and calculates an initial performance plan in accordance with an exemplary embodiment of the present disclosure.
Figure 3:
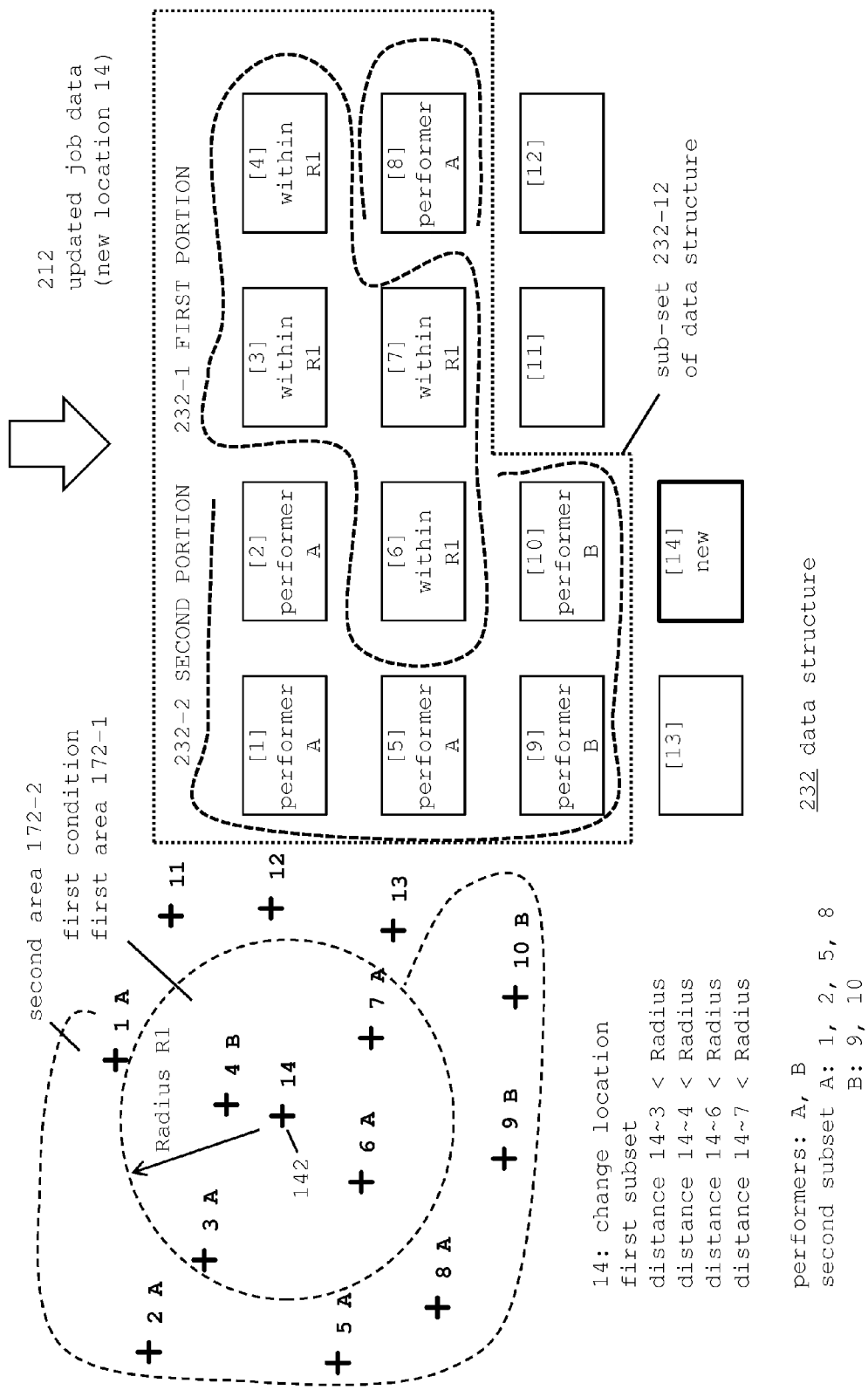
FIG. 3 illustrates the overview of the scenario in that the computer receives an updated job requirement and selects a sub-set of the data-structure for further processing in accordance with an exemplary embodiment of the present disclosure.
Figure 4:
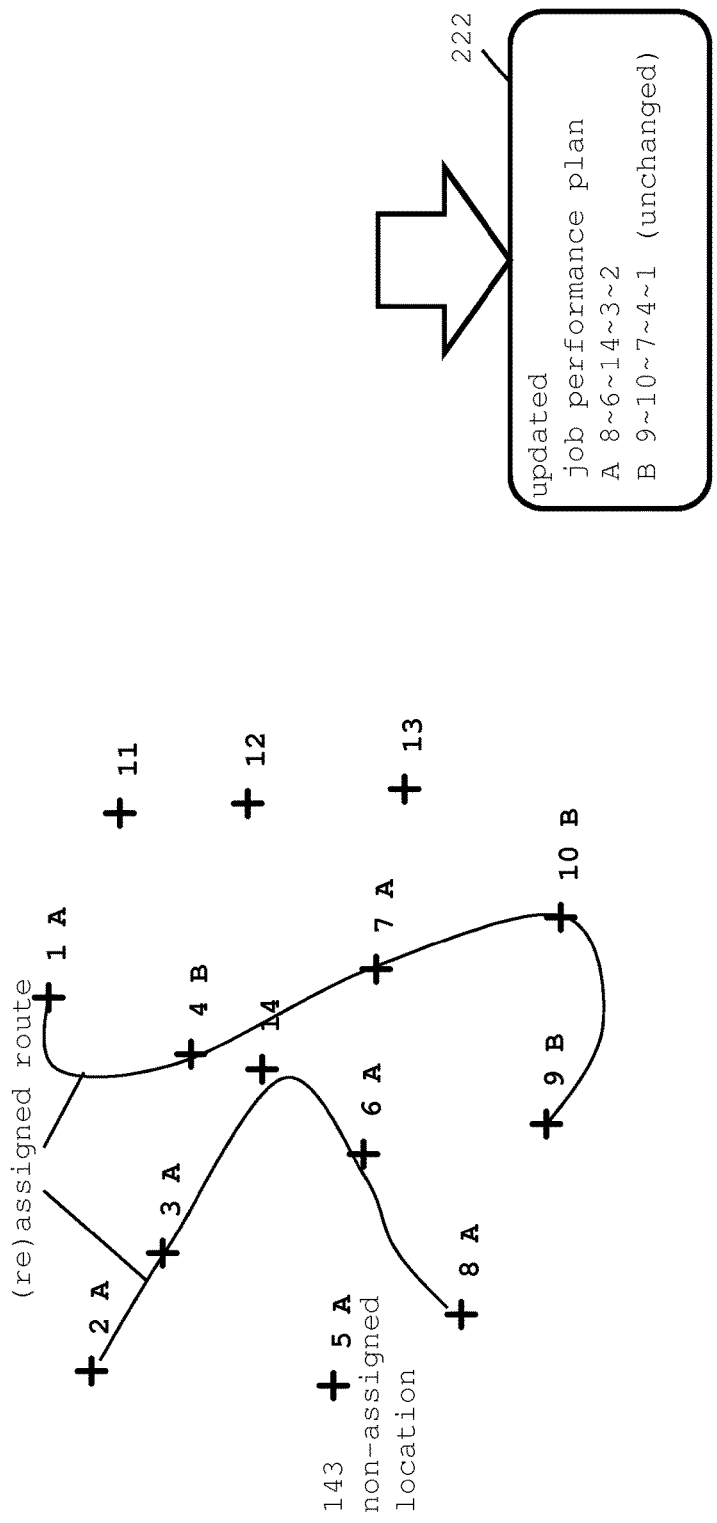
FIG. 4 illustrates the outcome of processing the sub-set of the data-structure in accordance with an exemplary embodiment of the present disclosure.
Figure 5:
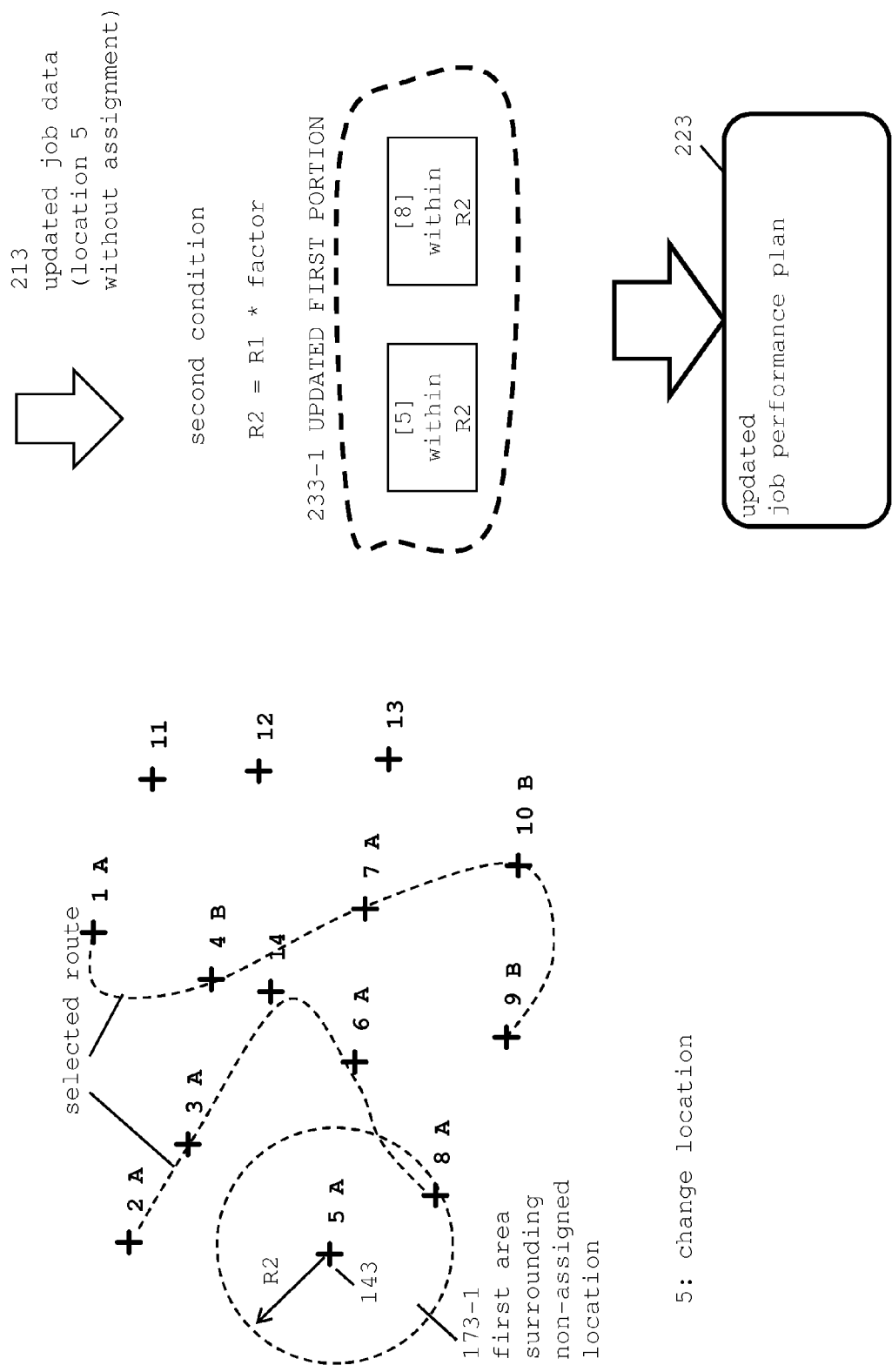
FIG. 5 illustrates a further update in a repetition to accommodate non-assigned locations in accordance with an exemplary embodiment of the present disclosure.
Figure 6:
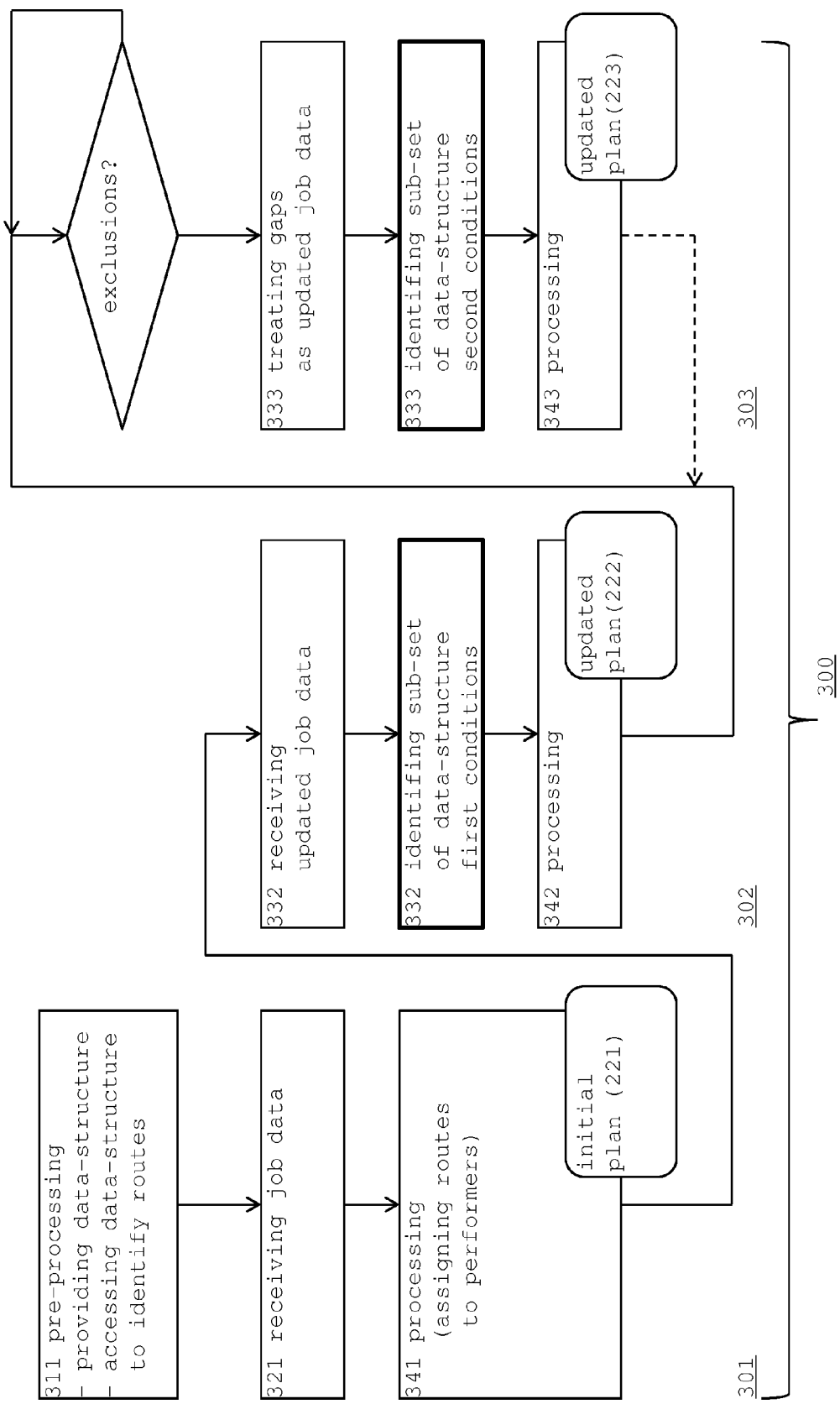
FIG. 6 illustrates a flow-chart diagram of a computer-implemented method for providing a job performance plan in accordance with an exemplary embodiment of the present disclosure.
Figure 7:
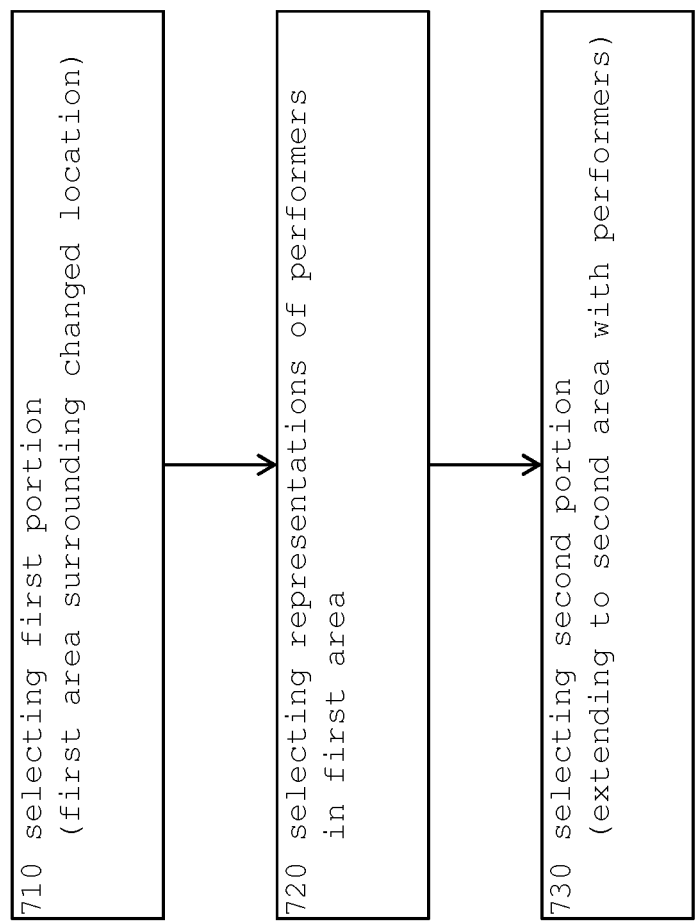
FIG. 7 illustrates details for a step to identifying a data-structure sub-set in accordance with an exemplary embodiment of the present disclosure.
Figure 8:
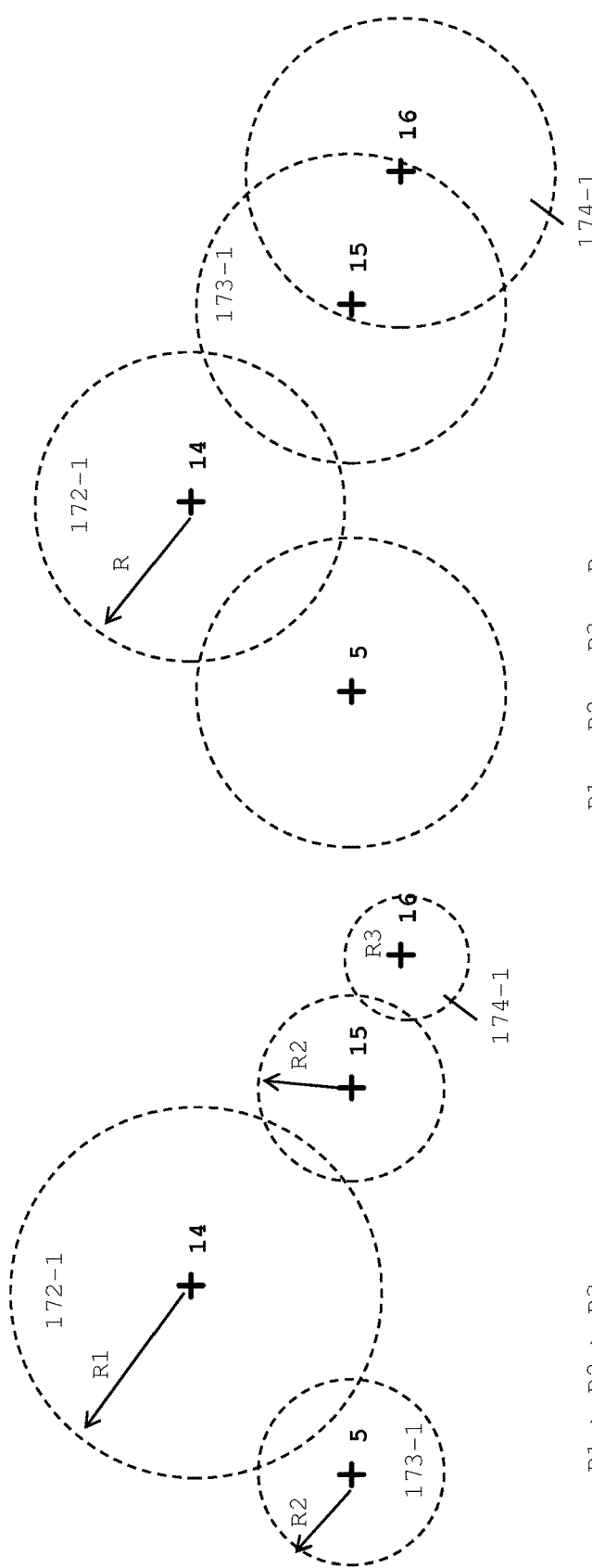
FIGS. 8-10 illustrate further options for the identification of the sub-set in accordance with an exemplary embodiment of the present disclosure.
Figure 9:
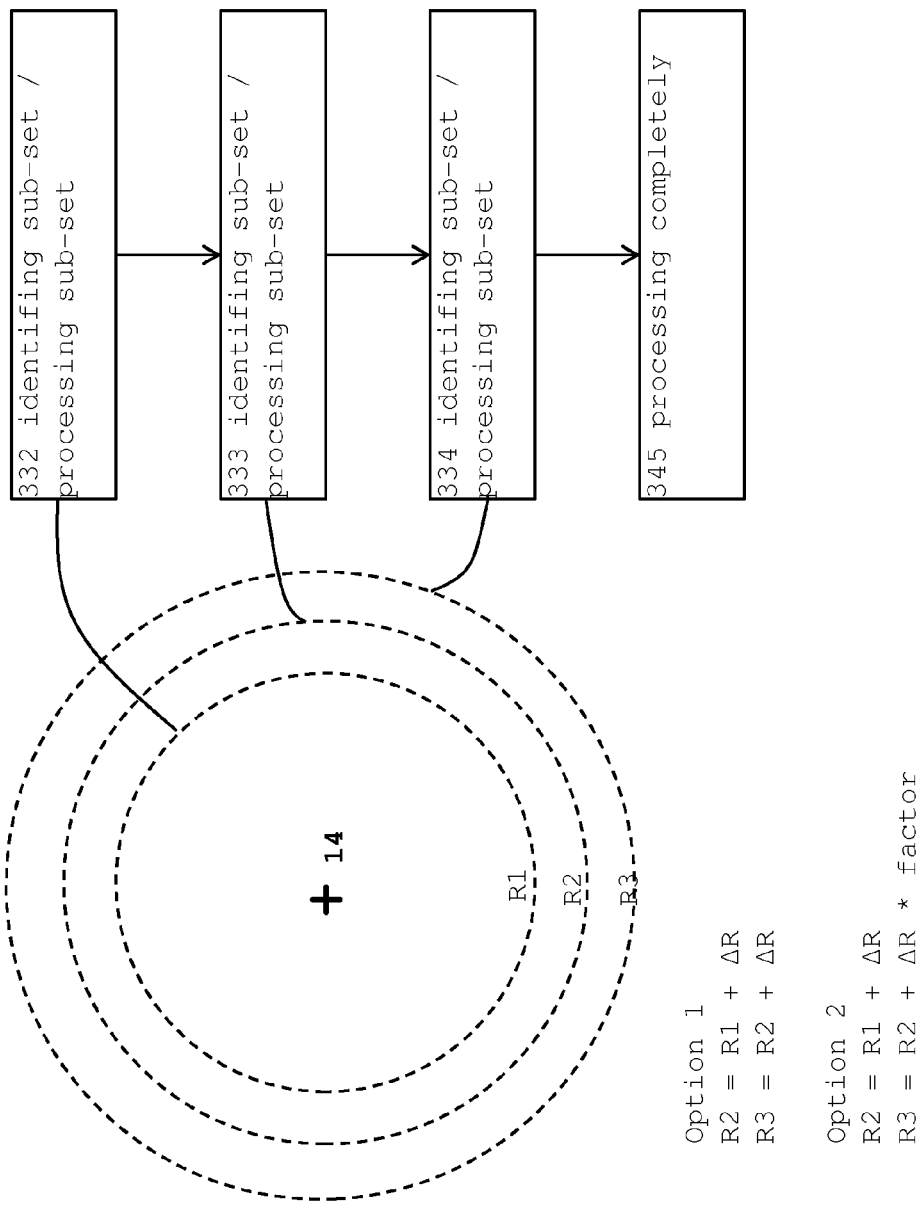
Figure 10:
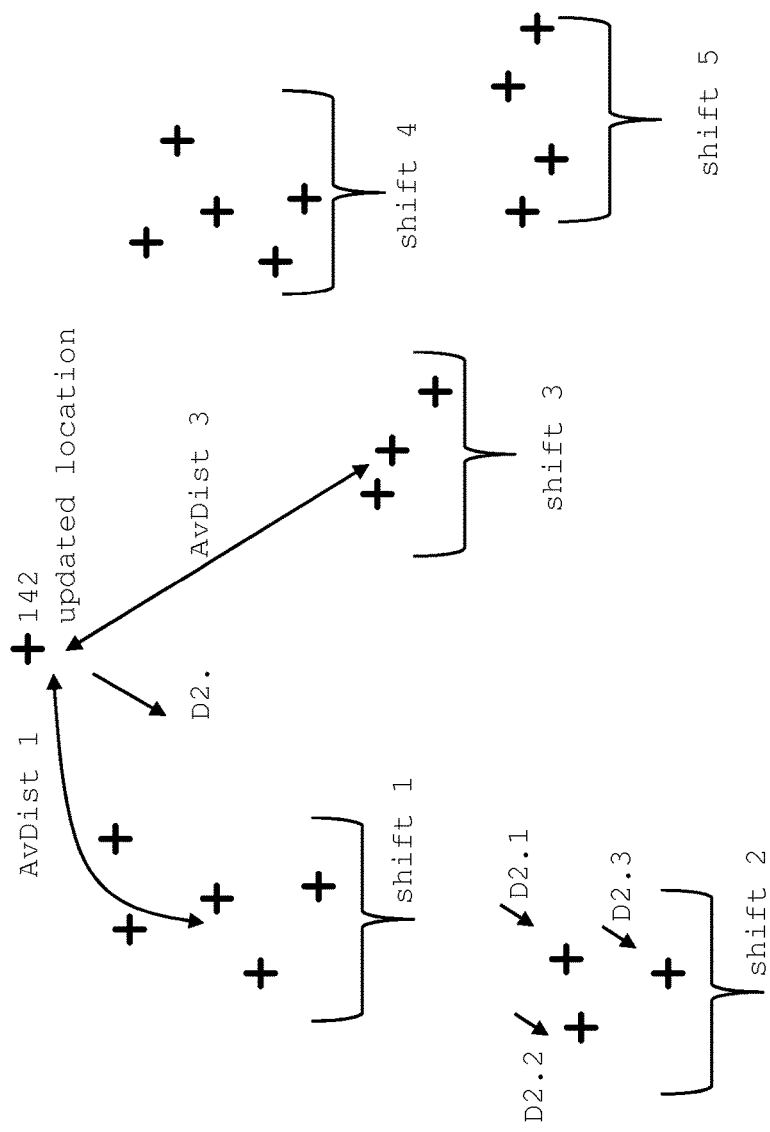

The description starts with an overview to the figures. FIGS. 1-4 illustrate an overview to a scenario by way of simplified examples. The left sides of the figures illustrate the real world with locations, routes between the locations, job performers etc.; and the right sides illustrate representations of the real world as they are processed by a computer. Reference numbers (X=0, 1 . . . 9) in the style 1XX are for the real world, and numbers in the style 2XX are for the computer. Numbers XX1 refer to initial states and numbers XX2, XX3 etc. refer to updates. Distinctions into "first" and "second" can be given as XXX-1 and XXX-2. The progress of time roughly corresponds to the sequence of figures: FIG. 1 illustrates the computer and the reality; FIG. 2 illustrates the computer having received job data and having provided an initial job performance plan; FIG. 3 and FIG. 4 illustrate how the computer accommodates data updates and provides an updated job performance plan. FIG. 5 illustrates how the computer accommodates gaps by repeating the process with modified conditions. FIGS. 6-7 summarize the explanation in method flow charts, and the remaining FIGS. 8-10 illustrate further options.

FIG. 1 illustrates an overview of a scenario with the real world and with a data-structure in a computer prior to receiving job requirements in accordance with an exemplary embodiment of the present disclosure. As shown in FIG. 1, real world 100 is illustrated similar as a geographical map with locations 140 (+ symbols). The locations are connectable by traffic ways such as streets, but the ways are left out for simplicity. Locations 140 can be numbered, in the example of FIG. 1, from 1 to 13.

At least one job performer 190 performs jobs at some of the geographical locations 140 and travels between some of the locations along routes 160. In the example, job performer 190 is illustrated by a dot symbol near location 8. The job performer is an entity that performs a specified task that is related to the location. The job performer can be a combination of one or more persons having an appropriate skill set, tools to perform the job, a vehicle to carry the persons and the tools. In service organizations, such a job performer combination is sometimes called a "shift".

In the example, job performer 190 is a team of three service technicians travelling by car. The team visits various customers to install equipment. The service technicians use special tools, including special measurement devices for the equipment.

Job performer 190 can also be a non-human entity such as a self-moving tool, a robot or the like.

Travelling between locations 140 consumes intra-location travel parameters (Res) that can be measured (during the travel) or estimated (before travelling). Travel parameters (Res) can include data that stands for technical phenomena such as distances d between locations, travel time t between locations (optionally, specific for different vehicles), energy consumption (e.g., fuel consumption for the car), emissions (e.g., carbon dioxide pollution or noise caused by the car), etc. Travel parameters (Res) can optionally include other figures, such as insurance costs for travelling in high risk areas (e.g., war zones), ship fees (e.g., for travelling by ferry boat), motorway tolls, tunnel tolls, fees for entering certain zones (e.g., London Congestion Charge) or the like. The travel parameters can stand for resources that the service organization can allocate for travel. In many cases, minimizing the use of the resources is desirable or even mandatory.

The travel parameters (Res) can depend on the direction of travel. For example, Res 9~10 indicates the resources (e.g., time, consumption) needed to travel from location 9 to location 10. (Res 10~9 could indicate the opposite direction).

Computer 200 can have processor, such as a central processing unit (CPU), microprocessor, field programmable gate array (FPGA), Application Specific Integrated Circuit (ASIC), or other suitable programmable processing or computing device or circuit as desired, memory and other hardware components. Computer 200 can be implemented as a computer system of physically separate computers that are connected by a network. Some of the functions can be executed by a so-called engine 270. Computer 200 further can have an input interface 210 to receive input data, and an output interface 220 to provide output data. The interfaces are illustrated by large arrow symbols. Both interfaces 210, 220 can be communicatively coupled to devices that are carried by job performers 190. For example, the performers carry mobile devices.

For simplicity, the illustration herein concentrates on how the computer processes the input data to the output data in an approach that saves computation resources (e.g., memory consumption, processing time). The memory stores data-structure 230 that represents some aspects of the real world that is modified during processing (input/output). For illustration, data structure 230 is illustrated as a graph structure with nodes 240 and edges 250. It should be noted that persons of skill in the art can implement the structure otherwise, without the need of graphs, for example, in tables or matrixes.

In data-structure 230, nodes 240 represent geographical locations 140. Specified nodes are symbolized by rectangles that are numbered from [1] to [13]. Edges 250 (or "arcs") represent travel parameters (Res) for job performers potentially travelling between the geographical locations. The edges are symbolized by lines, and specified edges are numbered by combinations of node numbers, such as [9]~[10]. For simplicity, many of the edges are left out from illustration. Using nodes for locations and edges for intra-location parameters is convenient for illustration, using the nodes for the inter-location parameters and the edges for the locations could also be possible.

Data attributes that can be associated with the nodes (and optionally with the edges) are also referred to as "labels". In the figures, such data attributes are illustrated by text written inside the nodes or along the edges. Computer 200 receives the data for the attributes, for example, through input interface 210.

Computer 200 can access data-structure 230 to identify potential travel routes 160 between geographical locations and can store the routes and corresponding accumulated travel parameters. It is convenient to store potential travel routes to specified locations as data attribute in the corresponding nodes. Data attributes that relate to routes 160 are route vectors 260.

For example, node [1] that corresponds to location 1 can store various potential routes that lead to location 1. For example, vector 9~10~7~4~1 stands for a route from location 9 to location 1 via locations 10, 7 and 4 in that order. For example, route 8~5~6~3~2 is stored as a vector in node [2] for travelling from location 8 to location 2 via locations 5, 6, and 3. For example, route 9~6~4 and route 9~10~7~4 are stored as vectors in node 4 to indicate alternative routes from location 9 to location 4. The keep the illustration simple, some nodes illustrate the route vectors by "~ ~ ~" without giving further details. In many cases, the routes have common start and end points, for example, the location of a depot. Usually, the start/end points are locations where jobs are not to be performed, but the scheduling system incorporates traveling from the start point to the first job location and from the last job location to the end point. In the example of FIG. 1, performer 190 starts at location 8. In case of re-scheduling, the performers are usually already on the way, so that the current location is used as start point for a modified route.

Nodes and edges store data that represents the travel parameters (Res). For the routes, the data attributes (labels) can further store corresponding accumulated travel parameters (AccRes). For example, route 9~10~7~4~1 can have travel times 9~10 (30 min), 10~7 (30 min), 7~4 (60 min) and 4~1 (30 min) that accumulate to 2 hours 30 minutes.

Travel parameter data (accumulated or not accumulated) for technical phenomena (as mentioned above) can be converted into more business oriented data, such as monetary costs or preference points. For example, travel time and fuel consumption could also be summarized to monetary amounts (e.g., 9~10~7~4~1: 10 €+15 €+20 €+10 €, or other currencies).

To save computation (e.g., use of memory to store the data), collecting data attributes can be limited. Parameter data (Res, AccRes) can be discarded if the parameters could reach and surpass a threshold, for example, a new potential route with a travel parameter that is 50 percent higher than a travel parameter attributed to the same node could be discarded.

It is noted that collecting data attribute is not necessarily limited in time. Computer 200 can collect attributes all the time in an on-going process that can run in parallel to the other processes described herein.

FIG. 2 illustrates the overview of the scenario in that the computer receives job data and calculates an initial performance plan in accordance with an exemplary embodiment of the present disclosure. As shown in FIG. 2, the computer 200 receives initial job data 211 (via input interface 210) and that calculates an initial performance plan (available at output interface 220). For simplicity, some details already introduced in connection with FIG. 1 are left out.

Job data 211 stand for constraints to perform the jobs. For example, job data 211 stand for job requirements for specified locations. In the example, jobs are called on to be performed at locations 1, 2, 3, 4, 5, 6, 7, 8, 9 and 10, and the data attributes in edges [1], [2], [3], [4], [5], [6], [7], [8], [9] and [10] are set accordingly. The figure uses the * symbol in data structure 231 (that is updated with respect to structure 230). Locations 11, 12 and 13 are locations for which performing jobs is not specified.

Job data 211 can also stand for job performer availability. In the example, there are two job performers (cf. 190) available, but each performer is limited to perform 5 jobs at maximum. This is the allowable number of locations to be assigned. The limitation can be set to a time interval. In the above example, the two service technician teams are available, during a working day.

Engine 270 (cf. FIG. 1) accesses data-structure 231 to select some of the routes and to assign the selected routes to the job performers. The result is initial job performance plan 221. In the example, plan 221 is a schedule that is communicated to performer 190-A to go along assigned route 161A (8~5~6~3~2), and communicated to performer 190-B to go along assigned route 161B (9~10~7~4~1). The other routes, non-selected routes can remain in the data-structure.

Operating engine 270 that provides the job performance plan with the assigned routes can be implemented by a variety of techniques. Data-structure 230, 231, job data 211 as well as the resulting plan 221 can be implemented in a matrix. Solving the matrix is a so-called linear problem. For solving a linear problem, engine 270 can use techniques that are commercially available, for example, by calling to linear problem solvers from VENTYX or IBM ILOG CPLEX. Plan 221 is usually available in a column of that matrix. For example, the column can have variables that indicate that performs are assigned to locations (e.g., "1" for assignment, "0" for no assignment).

Job data 211 can contain further details to be considered, such as the requirement of the job performers to prepare for the job, to take breaks, to switch the tool, to fuel the car, to wait for data, to clean up after finishing the job, to have time reserved etc. Job data 211 could include matching requirements (e.g., human skills, tool compatibility), time restrictions (e.g., appointment window for mandatory job performance, or exclusion window during that the job should not be performed).

The description explains the approach by an example with very few locations, but in reality, with 1000 or more locations, 100 or more job performers to be considered, the computation efforts cause a waiting time between receiving job data 211 and providing plan 221 and force the calculation into night hours or into other times that are not working times.

FIG. 3 illustrates the overview of the scenario in that the computer receives an updated job requirement and selects a sub-set of the data-structure for further processing in accordance with an exemplary embodiment of the present disclosure. As shown in FIG. 3, the computer 200 receives updated job data 212 and selects a sub-set 232-12 of data-structure 232 for further processing. It is not necessary to process the data-structure in total: Processing the data-structure only partially lead to the overall saving in computation, such as in time.

Updated job data 212 stand for updated job requirements for specified locations or stand for updated job performer availability. Updated job requirements for specified locations can include that performing the job is no longer required (e.g., a customer of the service technician team has cancelled the appointment), performing the job is required for a different geographical location (e.g., the customer has moved), or performing a new job is required.

Updated job data 212 that stand for updated job performer availability can include non-availability of the performer (e.g., illness of a person, repair of the vehicle or tool). It also can include positive change, in the sense of additional availability. There are many other constraints that might change.

The description of FIG. 3 takes the illustrative example of updated location 142 (also numbered 14), with the assumption that job performers 190-A and 190-B are the only available performers. In (updated) structure 232, node [14] represents the updated location 14. In the example, of FIG. 3, node [14] is new to the structure, so that computer 200 starts collecting data attributes, such as accumulated travel times, for potential routes etc. as described above in connection with FIG. 1.

In order to save computation time, engine 270 selects the routes and assigns the selected routes to the job performers by accessing a sub-set 232-12 (and not accessing the data-structure 231 as a whole).

But before the details for the sub-set of the data-structure are explained, the description looks at the real-world. Because not all locations are affected by the update, the locations are identified in a 3-step approach. The reference numbers correspond to FIG. 7. FIG. 7 illustrates details for a step to identifying a data-structure sub-set in accordance with an exemplary embodiment of the present disclosure.

(710) First area 172-1 can have geographical locations that comply with a first condition in relation to updated location 142. In the example, the first condition is a physical condition, for example, the distance value. As mentioned above, the distance value can be a geographical air distance calculated from geographical coordinates, a distance calculated under consideration of travel ways, the overall time or energy consumption that is required to travel, emissions caused by the travel, and other values.

(720) Some of the performers—the "first area performers" are scheduled to travel inside first area 172-1. These are the performers that are assigned to locations in the first area.

(730) There are locations outside the first area but with "first area performers", these are locations in second area 172-2.

Turning to computer 200, the data that allows such a location identification is available, for example, in the data-attributes (e.g., Res, AccRes) or in plan 222 (e.g., the existing assignments). Sub-set 232-12 will be a combination of first portion 232-1 (corresponding to the first area 172-1) with second portion 232-2 (corresponding to the first area 172-1).

In the example of FIG. 3, computer 200 identifies sub-set 232-12 of data-structure 232 by the exemplary first condition being a distance. The computer identifies at least a first set of nodes [3], [4], [6] and [7] that correspond to a first set of geographical locations 3, 4, 6 and 7 that are within a predetermined minimal geographical distance value (R1) from location 14. Looking from a different perspective, the locations of the first area 172-2 are located around location 14.

Illustration and description use the circle as a symbol for the first area, but it is noted that any other limitations to a search area are possible to use. For example, a rectangle (or even a square) can be used, such as if the computer uses (x,y) coordinates to represent the locations. Other area limitations can be suitable as well, for example, limitations taken from geo-location libraries that consider natural travel obstacles (e.g., rivers, lakes or mountains), administrative borders (e.g., between countries, administrative regions), areas defined by the service organisation, or other factors that relate locations to each other (e.g., languages in the region vs. languages of the technicians).

The computer identifies a set of performers that are assigned to the locations of first area 172-1. In the example, locations 3, 6 and 7 are assigned to performer A, and location 4 is assigned to performer B. The locations are implicitly assigned to the performers through the assigned routes.

Because the "inside-locations" 3, 4, 6, and 7 are relatively near the updated location 14, re-scheduling performer A or performer B to location 14 could be an option. However, re-scheduling might violate a condition set by other constraints. As a consequence, the further locations (and previous assignments) are included in the new calculation.

Because performers A or B might have locations outside the distance (e.g., outside first area 172-1) with assignments, the computer identifies second portion 232-2. The second set of nodes includes two sub-sets: [1], [2], [5] and [8] for performer A and [9] and [10] for performer B. Nodes [1], [2], [5], [8], [9] and [10] correspond to second area 172-2. FIG. 3 illustrates the sub-set 232-12 by a dotted line around the nodes. Sub-set 232-12 can have less data to be processed than data-structure 232. In the example, for practical reasons—location 14 is new—computer 200 includes node [14] into processing.

Having identified subset 232-12, the computer selects routes and assigns the selected routes to the job performers to provide updated job performance plan 222 by accessing sub-set 232-12 of data-structure 231 with the first set of nodes [3], [4], [6] and [7] and the second set of nodes [10] and [11].

FIG. 4 illustrates the outcome of processing the sub-set 232-12 of the data-structure 232 in accordance with an exemplary embodiment of the present disclosure. Updated job performance plan 222 plans performer A to travel the new route 8~6~14~3~2; and plans performer B to travel along the existing route 9~10~7~4~1. Compared to plan 221 (cf. FIG. 2), location 5 does not have a performer any longer and has turned into non-assigned location 143. Nevertheless, the requirement to perform a job at location 5 remains unchanged (cf. job data 211, FIG. 2).

In other words, processing updated job data 212 has led to an updated job performance plan 222 in that a specified location 143, 5 remains without a job performer assigned to that location. This problem is solved as explained in the following example.

FIG. 5 illustrates a further update in a repetition to accommodate non-assigned locations in accordance with an exemplary embodiment of the present disclosure. The computer identifies a sub-set again, but takes specified location 143, 5 as updated job data 213.

In this repetition, the computer can use a second condition that is related to the first condition by a numerical factor. The second condition can be derived from the first condition. In the example, the factor makes first area 173-1 for (an updated first portion 233-1 in the data-structure) smaller in comparison to the previously used first area 172-1 (cf. FIG. 3), that is R2=R1*factor. Area 173-1 (smaller area) can have locations 5 and 8. In the data-structure that corresponds to nodes [5] and [8]. The computer continues the identification as described above to find the second area, the computer processes the sub-set and provides updated performance plan 223.

The computer can further repeat the steps by cascading further first areas out of non-assigned locations. Details are given in FIGS. 8-10.

FIG. 6 illustrates a flow-chart diagram of a computer-implemented method for providing a job performance plan in accordance with an exemplary embodiment of the present disclosure. As shown in FIG. 6, computer-implemented method 300 is for providing the job performance plan (cf. FIGS. 2, 4, 5: 221, 222, 223) for a plurality of jobs to be performed at geographical locations and being assigned to job performers. As mentioned above, the job performance plan is represented by computer data. Method 300 is an approach to improve data processing that takes advantage of computation resources such as memory, processor and computation time.

Method 300 is illustrated with 3 activities 301, 302, 303. Activity 301 leads to initial job performance plan 211. Activities 302 and 303 lead to updated job performance plans 222 and 223. A dashed line from the end of 303 indicates the possibility to repeat activities 302 and 303.

FIG. 7 illustrates details for a step in activity 302 to identify the data-structure sub-set.

As in FIG. 6, activity 301 starts with pre-processing 311. The computer provides and accesses a data-structure to identify routes between the geographical locations. The computer receives 321 job data with job requirements for specified locations and with availability information for the job performers. The computer processes 341 the job data with the data-structure to provide initial job performance plan 221 in that some of the routes are assigned to specified job performers.

Activity 302 starts with receiving 332 updated job data with an updated location (as explained, the geographical location with an updated job requirement). In identifying step 332, the computer identifies a sub-set of the data-structure. The sub-set can have a first portion and a second portion. More in detail—FIG. 7—the computer selects 710 in the data-structure the first portion to correspond to a first area with geographical locations that comply with a first condition in relation to the updated location. In the data-structure, the computer selects 720 the performers for that location of the first area are assigned to. Technically, the computer selects the set of representations of the performers. Again in the data-structure, the computer then selects 730 the second portion to correspond to a second area having geographical locations that are also assigned to the performers. The computer processes 342 the updated job data with both portions of the sub-set (of the data-structure) and provides updated job performance plan 222 in that some of the routes are re-assigned to specified job performers.

Activity 303 is optionally executed in case that some of the jobs and locations are excluded from updated plan 222. The computer treats 333 gaps as updated job data, and repeats the identification 333 of the sub-set (cf. FIG. 7) with a second condition. The computer processes 343 the updated job data with both portions of the sub-set and provides updated job performance plan 223. Activity 303 is optionally repeated. The number of repetitions can be predefined, or the repetitions are stopped if a predefined computation time is reached.

As explained above, the data-structure can be a graph structure. Pre-processing 311 the data-structure to identify routes between the geographical locations can be executed with a data structure in that nodes correspond to the geographical locations and in that edges correspond to travel parameters (Res) for the job performers travelling between the geographical locations. Selecting (710) the first portion includes selecting a first sub-set of nodes that correspond to the first area with geographical locations. Selecting 730 the second portion includes selecting a second sub-set of nodes that correspond to the second area with geographical locations.

Pre-processing 311 the data-structure to identify routes between the geographical locations can include storing routes vectors and corresponding accumulated travel parameters in data attributes at the nodes of the data-structure.

Pre-processing 311 the data-structure to identify routes between the geographical locations can include removing route vectors and corresponding accumulated travel parameters (AccRes) if the accumulated travel parameters (AccRes) exceed pre-defined threshold values.

Processing 342 the updated job data with the sub-set of the data-structure to provide an updated job performance plan can include processing the updated job data together with the updated location.

The first condition for the first area of geographical locations can be complied with for geographical locations that surround the updated location with a predetermined maximal distance value (R1, R2).

If processing 342 the updated job data leads to an updated job performance plan in that a specified location remains without a job performer assigned to that location, activity 303 is triggered (identifying 332, 333 the sub-set of the data-structure, and processing 342, 343 the updated job data to be repeated with a specified location being received 333 by updated job data). The repetition of the identifying step 332, 333 can use a second condition that is related to the first condition by a numerical factor. The factor makes the first area for an updated first portion smaller in comparison to the previously used first area. In an alternative, the repetition of the identifying step 332, 333 can be executed for a geographical area for an updated first portion with substantially the same size as the previously used area.

Looking at the computation time, identifying 332, 333 and processing 342, 343 in combination are shorter in execution than processing 341 alone. As a consequence, activity 301 can be executed overnight (day-ahead, or offline), while activities 302, 303 can be executed during the day in short response to changes (intra-day, or online). Much simplified, activity 301 provides the basic performance plan that allows the job performers to start, activity 302 accommodates changes within short a computation time, and activity 303 maintains the accuracy of the assignment so that substantially no location remains without service.

FIGS. 6-7 also illustrate a computer program or a computer program product. The computer program product—when loaded into a memory of a computer via a non-transitory computer readable medium and being executed by at least one processor of the computer—performs some or all steps of the computer-implemented method 300. In other words, blocks stand for program modules and illustrate that the method can be implemented by a computer under the control of the program.

FIGS. 8-10 illustrate further options for the identification of the sub-set in accordance with an exemplary embodiment of the present disclosure.

FIG. 8 illustrates the repetition of the identifying step (332, 333) in cascades. Geographical area 173-1 is a first area that is derived by "circling around" non-assigned locations (e.g., location 5, or location 15). Further, first areas can be derived from further non-assigned locations (e.g., location 16). In other words, there are original first areas (173-1) and subsequent first areas (174-1).

Regarding the first condition, such as with regard to the distance value, FIG. 8 illustrates two options. In a first option, the distance value to the non-assigned location (in the centre) becomes smaller with every repetition (R1 around location 15 is larger than R2 around locations 5 and 15, larger than R3 around location 16. In the second option, the distance value remains substantially equal so that original first area and the subsequent first area have substantially the same sizes.

FIG. 9 illustrates modifications in the step order (cf. FIGS. 6-7). Although the computation time of processing steps 342 and 343 (sub-set only) is expected to be shorter than the computation time of overall processing 341 (complete data-structure), various modification are possible, such as in the order of steps. With the goal to identify clusters of independent locations, such a cluster can be identified prior to processing 345 (completely, or partially with the sub-set). In the example, the first area surrounding location 14 is gradually enlarged, with—first option—the radius being incremented equally (by a fixed delta amount), or with—second option—the radius being incremented non-equally (factor).

The suitable distances (or the condition in general) can be determined in iterations as well, with distances getting larger and smaller until a suitable distance is determined that is used for future calculations.

FIG. 10 illustrates modifications in the determination of locations in that the first condition is given as a rule to identify distance value between the updated location 142 and an average location of performers. The first condition can be complied with for a plurality of geographical locations that are assigned to an assigned job performer and that have an average distance value that is shorter than the predetermined maximal distance value.

As already discussed, performers are sometimes called "shifts". In the example of FIG. 10, there are 5 teams of technicians (or "shifts") assigned a variety of locations (+ symbols). In order to keep the existing cluster of location and shift assignments essentially unchanged, the condition includes inspecting the average distance value of a group of locations (e.g., assigned to shifts) to the updated location. In the example, there are 5 average distance values between updated location 142 and the regions in that the shifts are active (AvDist 1 to AvDist 5). An example to calculate the average distance value is given for the 3 locations 1, 2, 3 for shift 2:

$$\text{AVERAGE DISTANCE VALUE2} = (D2.1 + D2.2 + D2.3)/3$$

The average distance values can be ordered, and the lowest average distances values can be taken (Distance 1 and Distance 3). If the distance values are geographical distances, the lowest values corresponds to the shortest distance.

Optionally, to further save computation time, a representative distance (value) can be calculated by not taking all locations of a specified shift, but taking one location, or a percentage of the locations.

Exemplary embodiments of the disclosure can be implemented in digital electronic circuitry, or in computer hardware, firmware, software, or in combinations of them. The disclosure can be implemented as a computer program product, for example, a computer program tangibly embodied in an information carrier, for example, in a non-transitory machine-readable storage device (e.g., a non-transitory computer readable medium), for execution by, or to control the operation of, data processing apparatus, for example, a programmable processor, a computer, or multiple computers. A computer program as claimed can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network. The described methods can all be executed by corresponding computer products on the respective devices, for example, the first and second computers, the trusted computers and the communication means.

Method steps of the disclosure can be performed by one or more programmable processors executing a computer program to perform functions of the disclosure by operating on input data and generating output. Method steps can also be performed by, and apparatus of the disclosure can be implemented as, special purpose logic circuitry, for example, a field programmable gate array (FPGA) or an application-specific integrated circuit (ASIC).

Processors suitable for the execution of a computer program include, by way of example, both general and special purpose microprocessors, and any one or more processors of any kind of digital computing device. A processor can receive instructions and data from a read-only memory or a random access memory or both. The computer includes at least one processor for executing instructions and one or more memory devices for storing instructions and data. A computer can also include, or be operatively coupled to receive data from or transfer data to, or both, one or more mass storage devices for storing data, for example, magnetic, magneto-optical disks, optical disks or solid state disks. Such storage means can also provisioned on demand and be accessible through the Internet (e.g., Cloud Computing). Information carriers suitable for embodying computer program instructions and data include all forms of non-volatile memory, including by way of example semiconductor memory devices, for example, EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the disclosure can be implemented on a computer having a display device, for example, a cathode ray tube (CRT) or liquid crystal display (LCD) monitor, for displaying information to the user and an input device such as a keyboard, touchscreen or touchpad, a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input.

The disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the disclosure, or any combination of such back-end, middleware, or front-end components. Client computers can also be mobile devices, such as smartphones, tablet PCs or any other handheld or wearable computing device. The components of the system can be interconnected by any form or medium of digital data communication, for example, a communication network. Examples of communication networks include a local area network (LAN) and a wide area network (WAN), for example, the Internet or wireless LAN or telecommunication networks.

The computing system can include clients and servers. A client and a server can be remote from each other and interact through a communication network. The relationship of client and server arises by virtue of computer programs running on the respective computers and having a client-server relationship to each other.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A computer-implemented method for providing a job performance plan for a plurality of jobs to be performed at geographical locations and being assigned to job performers, the method comprising:
   in a processor of the computer:
      pre-processing a data-structure to identify routes between the geographical locations;
      receiving job data that represent job requirements for specified locations and that represent availability of job performers to travel along the routes and perform the jobs at the locations;
      processing the job data with the data-structure to provide an initial job performance plan, wherein some of the routes are assigned to specified job performers;
      receiving updated job data with a representation that is a geographical location with an updated job requirement;
      identifying, in response to receiving the updated job data, a sub-set of the data-structure having a first portion and a second portion by:
         selecting, in the data-structure, the first portion to correspond to a first area with first geographical locations that comply with a first condition in relation to the updated location;
         selecting, in the data-structure, representations of a set of performers that are assigned to geographic locations within the first area; and
         selecting, in the data-structure, the second portion to correspond to a second area with second geographical locations of jobs that are also assigned to the set of performers who are assigned to the geographic locations within the first area; and
      processing the updated job data with both portions of the sub-set of the data-structure to output an updated job performance plan, wherein some of the routes are re-assigned to specified job performers.

2. The method according to claim 1, wherein pre-processing the data-structure to identify routes between the geographical locations is executed with a graph data structure in that nodes represent the geographical locations, and in that edges represent travel parameters (Res) for the job performers travelling between the geographical locations, and wherein selecting the first portion includes selecting a first sub-set of nodes that correspond to the first area with the first geographical locations; and selecting the second portion includes selecting a second sub-set of nodes that correspond to the second area with the second geographical locations.

3. The method according to claim 2, wherein pre-processing the data-structure to identify routes between the geographical locations includes storing routes vectors and corresponding accumulated travel parameters in data attributes at the nodes of the data-structure.

4. The method according to claim 3, wherein pre-processing the data-structure to identify routes between the geographical locations includes removing route vectors and corresponding accumulated travel parameters (AccRes) if the accumulated travel parameters (AccRes) exceed pre-defined threshold values.

5. The method according to claim 1, wherein processing the updated job data with the sub-set of the data-structure to provide an updated job performance plan includes processing the updated job data together with the representation of the updated location.

6. The method according to claim 1, wherein the first condition for the first area of geographical locations is complied with for geographical locations that surround the updated location with a predetermined maximal distance value.

7. The method according to claim 6, wherein the maximal distance value is selected from the group of:
   a geographical air distance calculated from geographical coordinates,
   a distance calculated under consideration of travel ways,
   an overall time that is required to travel,
   energy consumption that is required to travel, and
   emissions caused by the travel.

8. The method according to claim 6, wherein the first condition for the first area of geographical locations is complied with for a plurality of geographical locations that are assigned to an assigned job performer and that have an average distance value that is smaller than the predetermined maximal distance value.

9. The method according to claim 1, wherein when processing the updated job data leads to an updated job performance plan such that a specified location remains without a job performer assigned to that location, the steps identifying the sub-set of the data-structure, and processing the updated job data are repeated with a representation of the specified location being received as updated job data.

10. The method according to claim 9, wherein repetition of the identifying step uses a second condition that is related to the first condition by a numerical factor that makes the first area for an updated first portion smaller than the previously used first area.

11. The method according to claim 9, wherein repetition of the identifying step is executed for an updated first portion that represents a geographical area with substantially the same size as the previously used geographical area.

12. The method according to claim 1, wherein the processing steps are executed by an engine.

13. The method according to claim 12, wherein the processing steps are executed by a separate solver program.

14. A computer for providing a job performance plan for a plurality of jobs to be performed at geographical locations and being assigned to job performers, the computer comprising circuitry configured to:
    pre-process a data-structure to identify routes between the geographical locations;
    receive job data that represent job requirements for specified locations and that represent availability of job performers to travel along the routes and perform the jobs at the locations;
    process the job data with the data-structure to provide an initial job performance plan, wherein some of the routes are assigned to specified job performers;
    receive updated job data with a representation that is a geographical location with an updated job requirement;
    identify, in response to receipt of the updated job data, a sub-set of the data-structure having a first portion and a second portion by:
        selecting, in the data-structure, the first portion to correspond to a first area with first geographical locations that comply with a first condition in relation to the updated location;
        selecting, in the data-structure, representations of a set of performers that are assigned to geographic locations within the first area; and
        selecting, in the data-structure, the second portion to correspond to a second area with second geographical locations of jobs that are also assigned to the set of performers who are assigned to the geographic locations within the first area; and
    process the updated job data with both portions of the sub-set of the data-structure to output an updated job performance plan, wherein some of the routes are re-assigned to specified job performers.

15. A computer program product including a computer program stored on a non-transitory computer readable medium that, when the computer program is loaded into a memory of a computer and is executed by at least one processor of the computer, causes the computer to:
    pre-process a data-structure to identify routes between geographical locations;
    receive job data that represent job requirements for specified locations and that represent availability of job performers to travel along the routes and perform jobs at the locations;
    process the job data with the data-structure to provide an initial job performance plan, wherein some of the routes are assigned to specified job performers;
    receive updated job data with a representation that is a geographical location with an updated job requirement;
    identify, in response to receipt of the updated job data, a sub-set of the data-structure having a first portion and a second portion by:
        selecting, in the data-structure, the first portion to correspond to a first area with first geographical locations that comply with a first condition in relation to the updated location;
        selecting, in the data-structure, representations of a set of performers that are assigned to geographic locations within the first area; and
        selecting, in the data-structure, the second portion to correspond to a second area with second geographical locations of jobs that are also assigned to the set of performers who are assigned to the geographic locations within the first area; and
    process the updated job data with both portions of the sub-set of the data-structure to output an updated job performance plan, wherein some of the routes are re-assigned to specified job performers.

* * * * *